April 17, 1956  O. G. MANDT  2,742,162
LOADING MACHINE

Filed Sept. 21, 1950  2 Sheets-Sheet 1

INVENTOR.
Obert G. Mandt
BY

United States Patent Office 2,742,162
Patented Apr. 17, 1956

2,742,162

LOADING MACHINE

Obert G. Mandt, Columbus, Ohio, assignor to Mandt Manufacturing Company, Columbus, Ohio, a corporation of Ohio Application September 21, 1950, Serial No. 185,983

4 Claims. (Cl. 214—2)

The present invention relates to a loading machine and particularly to loading machines employing a pivoted boom, and more particularly to indicating mechanism for indicating the load carried by the boom.

It is often desirable to determine, or compute, measure, or govern the amount of material moved by a loading machine. The present invention is directed to an indicator or scale, applied to a loading machine, for indicating the load carried by the boom, for example, for indicating the weight of the gravel, aggregate, coal, etc., contained in the bucket attached to the boom.

In carrying out the present invention, I have provided an indicator, such as a scale, having a load responsive member. Part of the indicator or scale is connected to the base for the pivotally mounted boom and another part is connected to the boom so that the indicator responds to and indicates the weight of the load on the boom. One of these parts is disconnectable so that, when the actual work is to be performed by the boom, the indicator cannot interfere with the operation of the boom.

In carrying out the present invention, I prefer to place a scale on the base for the boom and connect the boom with the load responsive member of the scale through a cable and provide for ready detachment of the cable and scale.

Further objects and advantages of the present invention will be apparent from the following description, reference being had to the accompanying drawings wherein a preferred form of embodiment of the invention is clearly shown.

In the drawings:

Fig. 3 is a diagrammatic view of a portion of the hydraulic system utilized for lifting and lowering the boom.

Figure 1:
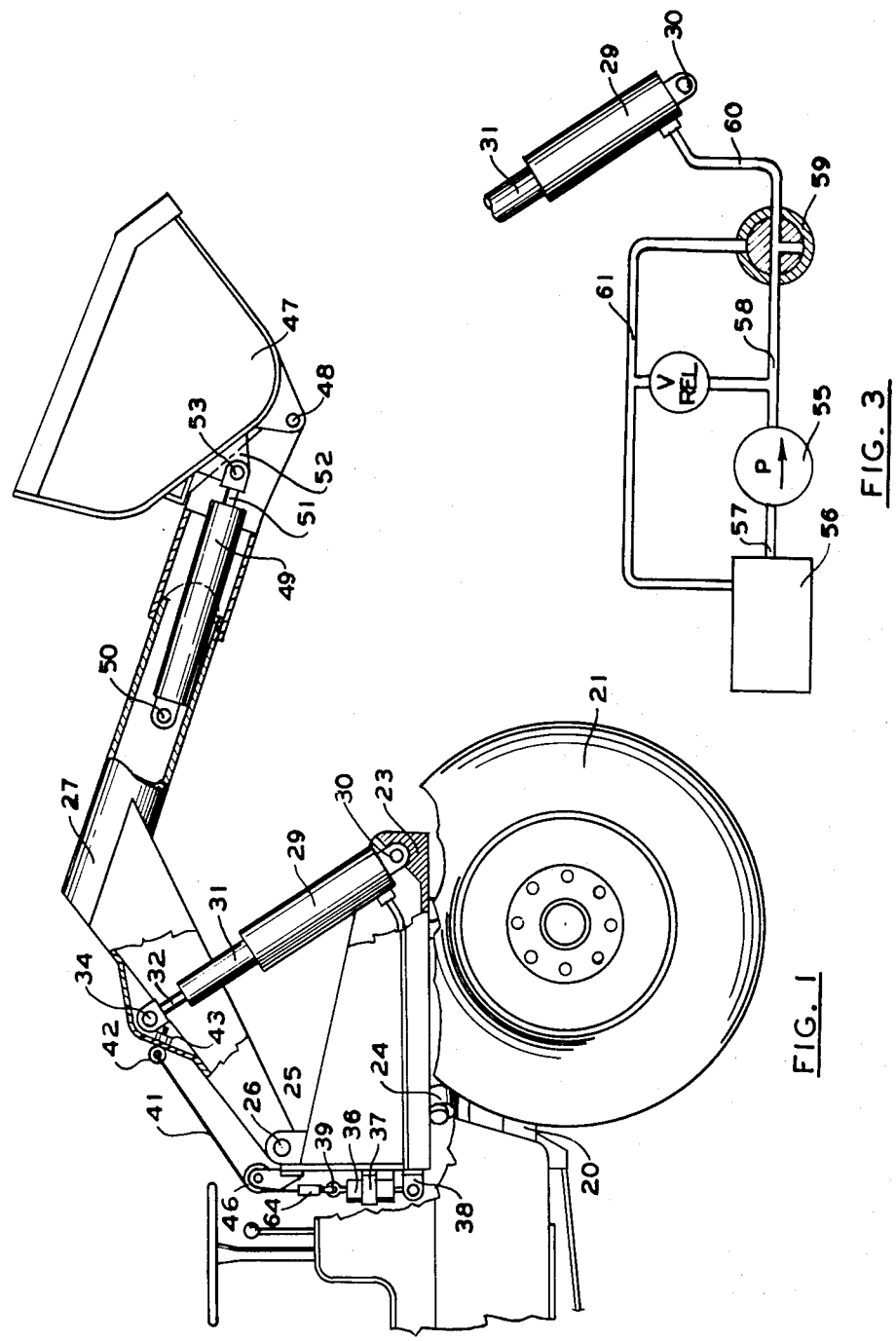
Fig. 1 is a fragmentary view of the front end of a loading machine, parts thereof being shown in section.
Figure 2:
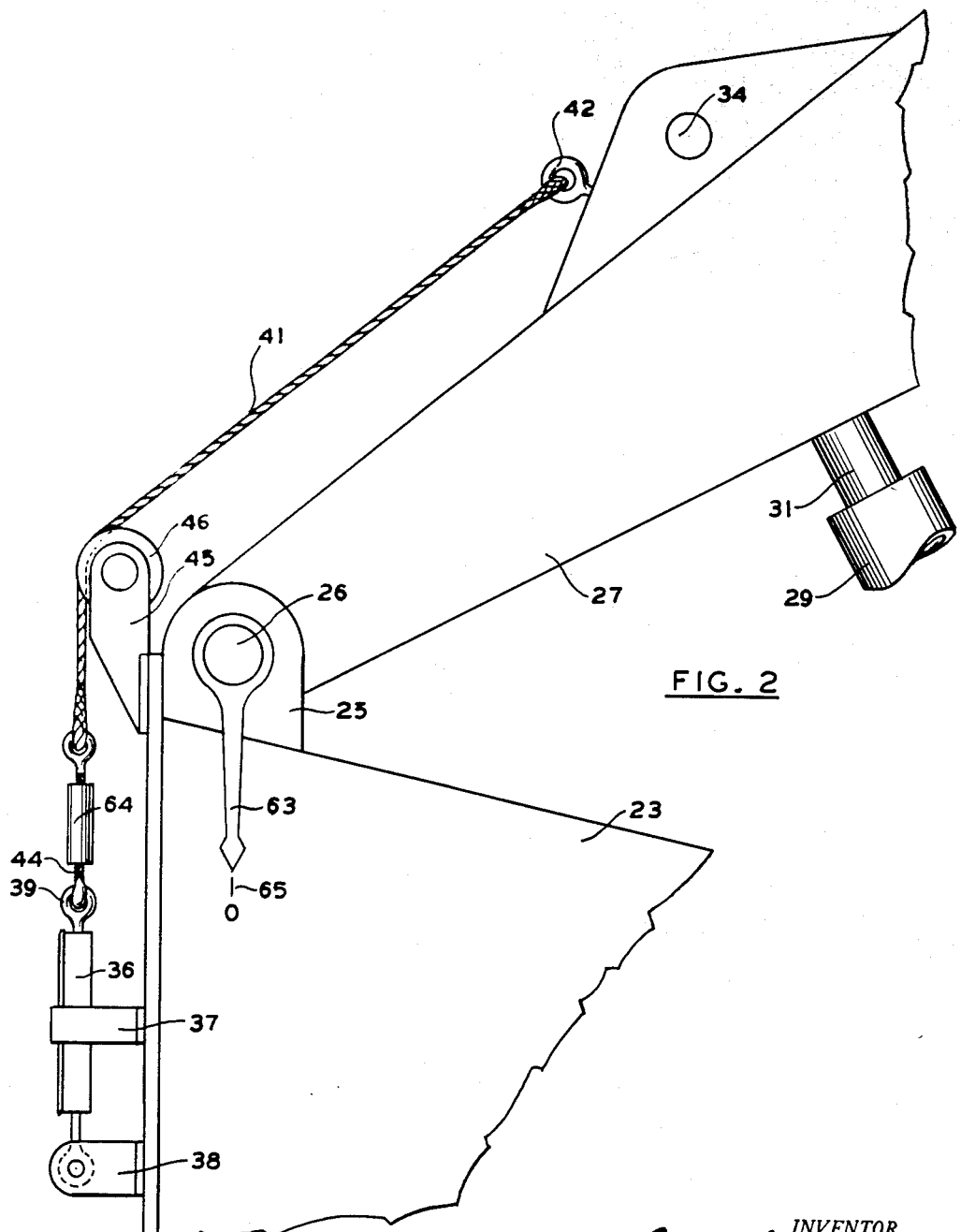
Fig. 2 is a fragmentary side view showing some of the parts shown in Fig. 1 but on a larger scale.

Referring more in detail to the drawings, the front end of the chassis of the loading machine is shown at 20 carrying a front wheel 21. The details of the particular type of loading machine is more clearly shown in the co-pending application of Vernon G. Mandt Serial Number 145,363 filed February 21, 1950. A turntable 23, is rotatably mounted on rollers on the chassis. One of these rollers is shown at 24. Upwardly projecting ears 25 are formed on the rear of the turntable 23 and rotatably carry a pivot 26 upon which the boom 27 is mounted. A multiple plunger hydraulic jack 29 is pivotally mounted on pivot 30 near the front bottom of the turntable. The plungers for the jack are shown at 31 and 32. The outer end of plunger 32 is pivotally attached by a pivot 34 to the boom 27.

A weight indicating mechanism is provided for weighing the amount of material carried by the boom. In the instant disclosure, this indicator is in the form of a spring loaded scale 36 which is suitably attached to the rear of the turntable 23 by brackets 37 and 38. The load responsive member of the scale 36 is shown at 39 having an eyelet at the upper end thereof. This member 39 is connectable with the boom through a cable 41. One end of the cable 41 is anchored to the boom 27 by an eyelet 42, which latter is held in place by a nut 43. The cable 41 passes over a pulley 46 and is connected with the load responsive member 39 of the scale 36 by a hook 44. Pulley 42 is attached to the rear of the turntable 23 through a bracket 45.

The load-carrier, actuated by the boom 27, is herein shown, for illustrative purpose, as a bucket 47 pivotally attached by pivot 48 to the front or free end of the boom 27. This bucket is herein shown as tiltable through a hydraulic jack 49. This jack is disposed within a hollow section of the boom and is pivoted by a pivot 50 to the boom. The plunger 51 of the boom is attached to a bracket 52 on the rear side of the bucket by a pivot 53.

Normally when work is being performed by the loading machine, for example, moving of materials by the bucket 47, the hook 44 is disconnected from the load responsive member 39 of the scale so that the scale in no way interferes with the normal operation of the boom. When it is desirable to weigh the contents of the bucket 47, the hook 44 is connected with member 39 and then all fluid pressure of the hydraulic jack 29 is released so that the weight of the boom and the bucket and its contents are imposed upon the member 39 and the reading is taken from the indicator hand (not shown) on the scale 36.

Any means may be employed for raising and lowering the jack but it is desirable to use a multiple plunger jack 29 as hereinbefore mentioned. That part of the hydraulic system dealing with operation of the jack is shown in Fig. 3 wherein the hydraulic pump 55 is suitably driven by the engine (not shown) of the loading machine, the liquid being withdrawn from a reservoir 56 through a pipe 57 and pumped under pressure through a pipe 58 through valve 59 and pipe 60 to the cylinder of the jack 29. In this manner the plungers 31 and 32 are raised. By turning the valve from the position shown, approximately 90 degrees, in a counter-clockwise direction, the liquid can flow from the cylinder through the drain pipe 61 back to reservoir. To raise the boom, valve 59 is moved to the position shown in Fig. 3 and then when it is desirable to weigh the load in the bucket 47, the raising of the boom is continued until the hook 40 can be connected with the eyelet 39. The valve 59 is then moved 90 degrees counter-clockwise, to release the pressure underneath the plungers whereby the load of the boom and bucket will be imposed upon the scale 36. The reading is then taken and the valve is again moved 90 degrees clockwise so as to carry the load by the jack and then the hook 44 is unhooked from the eyelet 39. The work of the boom is then continued through the operation of the jack 29 and the jack 49.

Under certain circumstances it is desirable to move a predetermined amount, by weight, of the material to be moved with each operation of the boom and bucket. In carrying this out, the operator will collect an excess of material desired in the bucket, and, after the cable is re-hooked with the scale and the pressure released from the jack 29, the jack 49 will be actuated to tilt the bucket so that an amount is unloaded therefrom to carry the predetermined selected amount, as registered by the scale 36.

The reading of the scale should be zero when the boom is in a predetermined position and no load is contained within the bucket. The predetermined position of the boom may be indicated by a hand 63 carried by the pivot 26, which latter is moved with the boom as the boom pivots about ears 25. The registrable weight of the boom and bucket being known, and the scale being compensated for this weight, so as to read zero when the weight of the boom is imposed upon the scale at a predetermined position of the boom, the cable is connected with the scale and then the turnbuckle 64 turned either one way or the other so that the scale registers zero when the hand 63 registers with the zero indicia 65, suitably placed upon the side of the turn-table 23.

It will thus be apparent from the foregoing that there has been provided a simple mechanism for measuring the quantity of material contained in the bucket of a loading machine employing a pivotally mounted boom.

While the form of embodiment of the present invention as herein disclosed constitutes a preferred form, it is to be understood that other forms might be adopted, all coming within the scope of the claims which follows.

I claim:

1. A loading machine including a base element, a boom element mounted for pivotal movement on the base element, means for raising the free end of the boom element, a weighing indicator having a stationary member and a movable load responsive member, means connecting one of the indicator members with one of said elements and means connecting the other indicator member with the other of said elements, a pulley positioned at said pivotal mounting for aligning and supporting certain of said connecting means during pivotal movement of the boom element, said raising means being capable of being rendered ineffective whereby the weight of the boom element is registerable on the indicator when the elements are connected with one another through the indicator, one of said connecting means being detachable, and cooperating indicia on the boom and base elements for indicating position of boom at which weighing is to be effected, said indicia including an indicator hand operatively connected with and movable with the boom element.

2. A loading machine including a base element, a boom element mounted for pivotal movement on the base element, means for raising the free end of the boom element, a weighing indicator having a stationary member and a movable load responsive member, means connecting one of the indicator members with one of said elements and means connecting the other indicator member with the other of said elements, a pulley positioned at said pivotal mounting for aligning and supporting certain of said connecting means during pivotal movement of the boom element, said raising means being capable of being rendered ineffective whereby the weight of the boom element is registerable on the indicator when the elements are connected with one another through the indicator, one of said connecting means being detachable, one of said connecting means being adjustable to vary the distance between the two connecting means, and cooperating indicia on the boom and base elements for indicating position of boom at which weighing is to be effected, said indicia including an indicator hand operatively connected with and movable with the boom element.

3. A loading machine including a base element, a boom element mounted for pivotal movement on the base element, means for raising the free end of the boom element, a weighing indicator having a stationary member carried by the base element and having a movable load responsive member, a cable attached to the boom element and detachably connectable with the moving indicating members, a pulley positioned at said pivotal mounting for aligning and supporting the cable during pivotal movement of the boom element, said raising means being capable of being rendered ineffective whereby the weight of the boom element is registrable on the indicator when the cable ise connected with the movable indicator member, and cooperating indicia on the boom and base elements for indicating position of boom at which weighing is to be effected, said indicia including an indicator hand operatively connected with and movable with the boom element.

4. A loading machine including a base element, a boom element mounted for pivotal movement on the base element, means for raising the free end of the boom element, a weighing indicator having a stationary member carried by the base element and having a movable load responsive member, a cable attached to the boom element and detachably connectable with the moving indicating members, a pulley positioned at said pivotal mounting for aligning and supporting the cable during pivotal movement of the boom element, said raising means being capable of being rendered ineffective whereby the weight of the boom element is registrable on the indicator when the cable is connected with the movable indicator member, and longitudinal adjusting means between the cable and the indicator, and cooperating indicia on the boom and base elements for indicating position of boom at which weighing is to be effected, said indicia including an indicator hand operatively connected with and movable with the boom element.

References Cited in the file of this patent

UNITED STATES PATENTS

| | | |
|---|---|---|
| 250,183 | Arnot | Nov. 29, 1881 |
| 941,571 | Fullbright | Nov. 30, 1909 |
| 1,745,174 | Lichtenberg | Jan. 28, 1930 |
| 2,022,844 | Christian | Dec. 3, 1935 |

FOREIGN PATENTS

| | | |
|---|---|---|
| 13,470 | Great Britain | July 12, 1895 |
| 247,980 | Great Britain | July 22, 1926 |